(12) United States Patent
Varghese et al.

(10) Patent No.: US 10,657,564 B2
(45) Date of Patent: May 19, 2020

(54) APPROVAL OF ADVERTISEMENTS BASED ON REVIEW OF ADVERTISEMENT COMPONENTS

(71) Applicant: Facebook, Inc., Menlo Park, CA (US)

(72) Inventors: Mathew Varghese, Los Altos, CA (US); Nuwan Senaratna, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 552 days.

(21) Appl. No.: 13/756,357

(22) Filed: Jan. 31, 2013

(65) Prior Publication Data

US 2014/0214557 A1     Jul. 31, 2014

(51) Int. Cl.
*G06Q 30/02*     (2012.01)
(52) U.S. Cl.
CPC .................. *G06Q 30/0277* (2013.01)
(58) Field of Classification Search
USPC ......................................................... 705/14
See application file for complete search history.

(56) References Cited

U.S. PATENT DOCUMENTS

| | | | |
|---|---|---|---|
| 2006/0149623 A1* | 7/2006 | Badros | G06Q 30/02 705/14.66 |
| 2007/0156524 A1* | 7/2007 | Grouf et al. | 705/14 |
| 2008/0040389 A1* | 2/2008 | Seth et al. | 707/104.1 |
| 2008/0059312 A1* | 3/2008 | Gern et al. | 705/14 |
| 2009/0076901 A1* | 3/2009 | Janos | G06Q 30/02 705/14.26 |
| 2010/0145762 A1* | 6/2010 | Coladonato et al. | 705/10 |
| 2010/0262460 A1* | 10/2010 | Brown | G06Q 30/02 705/14.53 |
| 2013/0151346 A1* | 6/2013 | Schoen | 705/14.66 |

* cited by examiner

*Primary Examiner* — Gautam Ubale
(74) *Attorney, Agent, or Firm* — Fenwick & West LLP

(57) ABSTRACT

As components of an advertisement are received by an online system, the online system determines whether the received components satisfy one or more policies of the online system. If a component does not satisfy a policy of the online system, the user providing the components is notified when the component is provided, allowing the user to modify the component. Additionally, stored data describing previously analyzed components are compared to received components, and the stored data is used if the received component matches a previously analyzed component. This process expedites approval of advertisements by the online system.

17 Claims, 3 Drawing Sheets

APPROVAL OF ADVERTISEMENTS BASED ON REVIEW OF ADVERTISEMENT COMPONENTS

BACKGROUND

This invention relates to online systems and in particular to reviewing advertisements in an online system.

A large number of online systems derive revenue by showing advertisements to their users. Advertisements allow advertisers, or other providers, to obtain public attention to their products, services, opinions, or causes. Presenting advertisements allows advertisers to persuade persons viewing the advertisement to respond in a certain way to advertised products, services, or other information. Providers advertising their products, services, opinions, or causes in the online system may manually create an advertisement through a web page provided by the online system or automatically create an advertisement through an application programming interface (API).

As the online system grows and the number of users that visit the online system increases, the number of providers trying to advertise their products in the online system also increases. Additionally, online systems often specify certain policies for advertisements to comply with before being presented by the online system. Manual review of advertisements for compliance with online system policies is a time consuming process that is not scalable as the number of providers promote their products increases. Additionally, manual review of advertisements may lead to inconsistencies in review as reviewers may have different views regarding compliance of an advertisement.

Another problem with manual reviews is that advertisers do not know the likelihood a newly created advertisement will be approved. Accordingly, a large number of newly created advertisements are submitted for review with a high probability or rejection. Many rejected advertisements are modified and re-submitted multiple times, further increasing the number of reviews by the online system.

SUMMARY

An online system generates revenue by presenting advertisements to its users. To enhance user experiences, advertisements presented by the online system are often limited to advertisements satisfying certain requirements. Reviewing the advertisements for compliance of the different requirements and policies can be a time consuming process. Conventional online systems manually review advertisements, so depending on the complexity of the advertisement and the backlog of the reviewers, approval of an advertisement may take anywhere from a few hours to a few days. This may result in lower revenues for the online system.

Embodiments of the invention divide new advertisements into components and separately review each component of an advertisement. Analyzed components are stored in a database or a repository. When reviewing a component of an advertisement, the online system accesses the database to determine if the component, or a similar component, has been reviewed. If a component matches a previously reviewed component, the online system uses the results of the previous review of the component rather than reviewing the component. Because advertisements often include overlapping components, reusing previous reviews of a component reduces the amount of time and number of reviews to approve or reject advertisements.

In one embodiment, the online system stores previously reviewed components analyzed using complex processes; for example, image processing may be complex and time consuming, so results of reviews of images are stored. As an example, determining that an image references alcoholic beverages is difficult and may consume significant computational resources if reviewed multiple times. However, a title is usually short and conveys a clear message, so limited computational resources are used to analyze a title. Hence, storing results of image analysis provides a savings in the time for analyzing an advertisement while storing results of analysis of a title provides limited, if any, reduction in advertisement analysis time. Hence, analyzing components of advertisements and storing the results of the analysis expedites approval of advertisements and results in a more consistent advertisement review process.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

An online system reviews advertisements against one or more policies. The advertisement review breaks advertisements ("ads") into components (e.g., title, content, image, landing page, etc.). Each component, rather than the entire ad, is then reviewed. A signature is computed for each component and stored. Subsequently received advertisements are broken into components which are compared to the stored signatures to determine if the component was previously reviewed. As advertisements often include overlapping components, reviewing components instead of entire advertisements reduces the number of reviews needed.

AD Review System Environment

Figure 1:
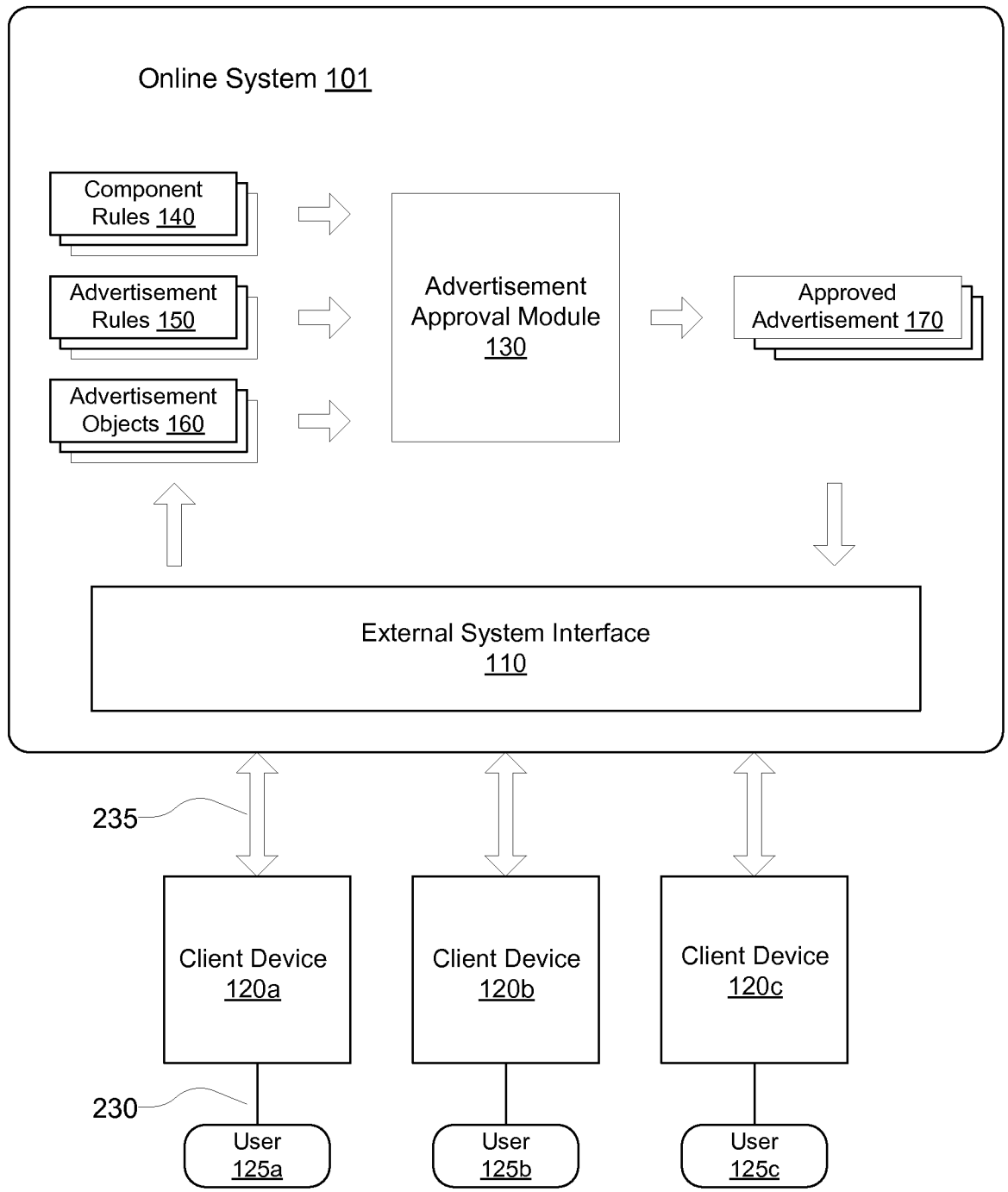
FIG. 1 is a diagram of a system environment for approving advertisements in an online system, in accordance with an embodiment of the invention.

FIG. 1 is a diagram of one embodiment of a system environment for approving advertisements in an online system. FIG. 1 and the other figures use like reference numerals to identify like elements. A letter after a reference numeral, such as "120A," indicates that the text refers specifically to the element having that particular reference numeral. A reference numeral in the text without a following letter, such as "120," refers to any or all of the elements in the figures bearing that reference numeral (e.g., "120" in the text refers to reference numerals "120A" and/or "120B" in the figures).

Users 125*a*, 125*b*, 125*c* interact with the online system 101 using client devices 120*a*, 120*b*, 120*c*. A client device 120 used by a user 125 to interact with the online system 101 may be any computing device having data processing and data communication capabilities. Examples of client devices 120 include a desktop computer, a laptop computer, a notebook, a tablet computer, a smart phone, a personal digital assistant (PDA), or other suitable computing device.

In one embodiment, the online system 101 includes an external system interface 110 for transmitting and receiving data between the online system 101 and one or more client devices 120. The online system 101 maintains different types of objects representing data used for advertisement creation. Examples of objects maintained by the online system 101 include component rules 140, advertisement rules 150, advertisement objects 160, and approved advertisement objects 170. A component rule object 140 stores information describing how to identify one or more components of an advertisement and determining whether a component satisfies one or more policies of the online system 101. An advertisement rule object 150 stores information describing criteria for determining whether an advertisement satisfies one or more policies of the online system 101 based on whether components of the advertisement satisfy one or more policies of the online system 101. The advertisement objects 160 store information describing advertisements provided to the online system 101 form one or more advertisers. An approved advertisement object 170 stores information describing characteristics of an advertisement determined to satisfy at least a threshold number of policies of the online system 101 by an advertisement approval module 130. These objects are further described in detail herein. The online system 101 is further described below in conjunction with FIG. 2.

Online System Architecture

Figure 2:
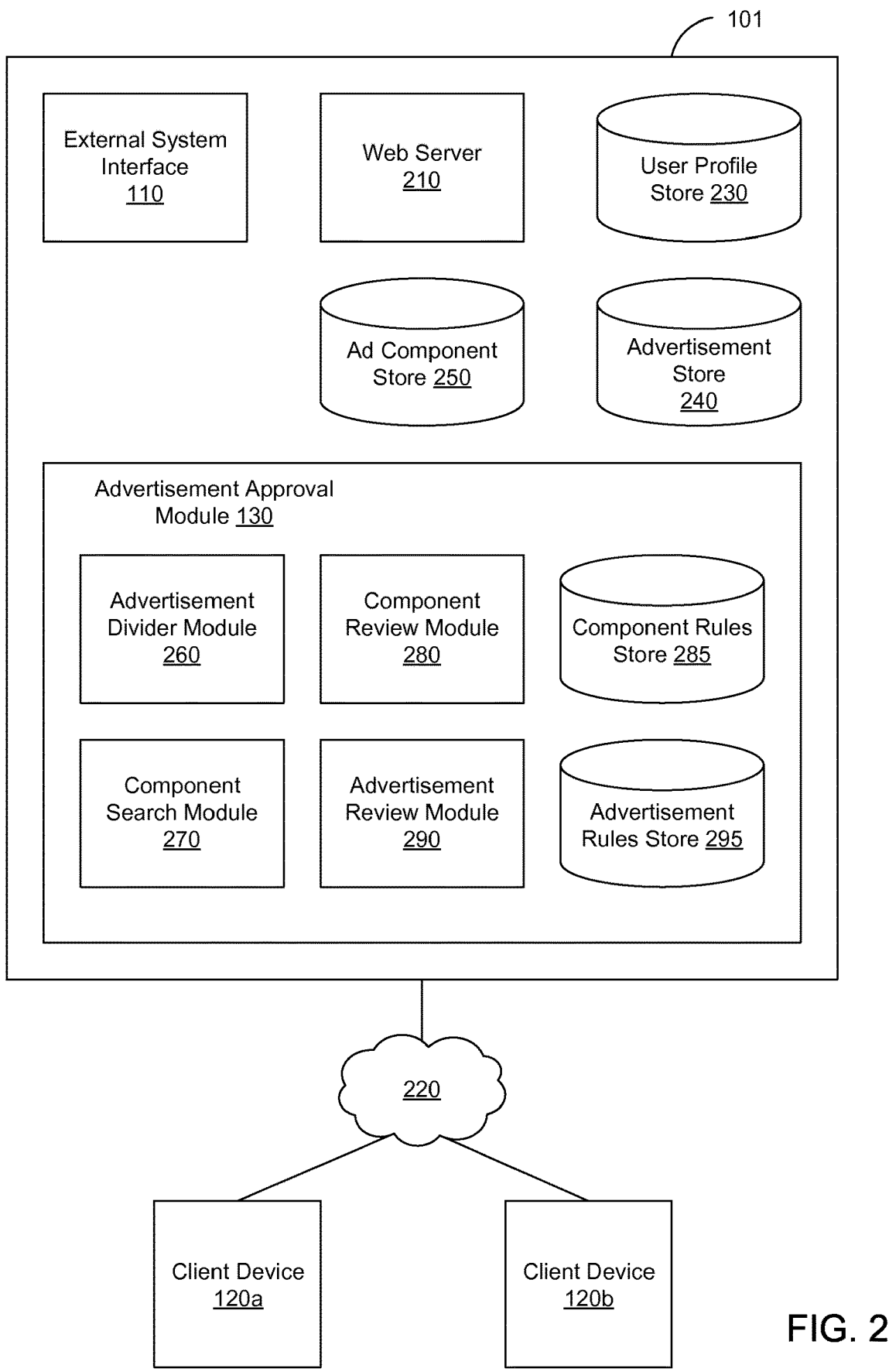
FIG. 2 is a diagram of a system architecture of an online system for approving advertisements, in accordance with an embodiment of the invention.

FIG. 2 is a block diagram of one embodiment of a system architecture of an online system 101 for approving advertisements. In the embodiment shown by FIG. 2, the online system 101 includes a web server 210, an external system interface 110, a user profile store 230, an advertisement store 240, an ad component store 250, and an advertisement approval module 130. In other embodiments, the online system 101 may include additional, fewer, or different modules for various applications. Conventional components such as network interfaces, security mechanisms, load balancers, failover servers, management and network operations consoles, and the like are not shown so as to not obscure the details of the system.

The online system 101 allows users to communicate or otherwise interact with each other and access content. The online system 101 stores user profile objects in the user profile store 230. Information stored in user profile store 230 describes the users of the online system 101, including biographic, demographic, and other types of descriptive information, such as work experience, educational history, gender, sexual preferences, hobbies or preferences, location, and the like.

The web server 210 links the online system 101 via a network 220 to one or more client devices 120; the web server 210 serves web pages, as well as other web-related content, such as JAVA®, FLASH®, XML, and so forth. The web server 210 receives and routes messages between the online system 101 and the client devices 210. These messages may be instant messages, queued messages (e.g., email), text and SMS (short message service) messages, or any other suitable messaging technique.

Interactions between the client devices 120 and the online system 101 are typically performed via a network 220. In one embodiment, the network 220 uses standard communications technologies and/or protocols. Thus, the network 220 can include communication channels using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Examples of networking protocols used on the network 220 include multiprotocol label switching (MPLS), the transmission control protocol/ Internet protocol (TCP/IP), the User Datagram Protocol (UDP), the hypertext transport protocol (HTTP), the simple mail transfer protocol (SMTP), the file transfer protocol (FTP), etc. The data exchanged over the network 220 may be represented using technologies and/or formats including hypertext markup language (HTML), extensible markup language (XML), etc. In addition, all or some of the communication channels may be encrypted using conventional encryption technologies such as secure sockets layer (SSL), transport layer security (TLS), virtual private networks (VPNs), Internet Protocol security (IPsec), etc. In another embodiment, custom and/or dedicated data communication technologies may be used in addition to, or instead of, those described above. Depending upon the embodiment, the network 220 may also include links to other networks such as the Internet.

The advertisement store 240 of the online system 101 stores information describing advertisements, for example, advertisements represented as advertisement objects 160. Each advertisement object 160 is associated with a user account. An advertisement object 160 may be manually created through an interface provided by the online system 101. Alternatively, one or more advertisement objects 106 may be created using application programming interface (API). After an advertisement object 160 is created, it is reviewed before being presented to other users of the online system 101. In some embodiments, the advertisement store 240 stores advertisement objects 160 satisfying one or more policies of the online system 101 and removes expired and/or rejected advertisement objects 160. Other embodiments maintain advertisement objects 160 in the advertisement store 240 even if advertisement objects 160 do not satisfy one or more policies of the online system 101 or are expired.

The advertisement ("ad") component store 250 stores signatures describing advertisement components compared to one or more policies of the online system 101. The ad component store 250 also stores information indicating whether an advertisement component satisfies one or more policies of the online system 101, such as the results of analysis of an advertisement component by the advertisement approval module 130. In some embodiments, the ad component store 250 stores the entire component and whether the component satisfies one or more policies of the online system 101. Other embodiments store a representation of the components such as a hash or a signature describing a component.

The advertisement approval module 130 approves or rejects advertisement objects 160 based on whether components of an advertisement satisfy one or more policies of the online system 101. The advertisement approval module 130 includes an advertisement divider module 260, a component search module 270, a component review module 280, a component rules store 285, an advertisement review module 290, and an advertisement rules store 295. Details of the advertisement approval module 130 are further described herein.

Advertisement Divider

The advertisement divider module 260 partitions an advertisement into one or more components. In one embodiment, the advertisement divider module 260 partitions an advertisement into one or more of a title, a body, an image, a landing page, an audience, an account and a campaign. The title provides a brief description of the advertisement. The body, or text, of an advertisement provides details about a product, service, or other content associated with the advertisement. The image is graphical data displayed by the advertisement. A landing page, or destination, is a web page, application, web site, or other network destination that a user is directed to when accessing the advertisement. The audience component includes characteristics of users to be presented with the advertisement. An account identifies the advertiser creating the advertisement. The campaign stores other information such as the timeframe during which an advertisement is presented, a budget for presenting the advertisement, the amount of money the online system 101 charges for presenting the advertisement to users, or other suitable information. In other embodiments, different and/or additional components may be generated from an advertisement.

When a component of an advertisement is identified, the component search module 270 determines whether the ad component store 250 includes data indicating whether a component from another advertisement matching, or similar to, the component satisfies one or more policies of the online system 101. If a match is found, the advertisement approval module 130 retrieves the data associated with the matching or similar component and uses the data associated with the matching or similar component to indicate whether the component satisfies one or more policies of the online system 101. The component search module 270 may use different processes to determine the similarity between two components. For example, a threshold level of similarity may be specified so that a stored components having at least a threshold similarity to a component, but not fully matching the component, is identified as a match for the component. For example, whether a color image satisfies one or more policies of the online system 101 may be used to indicate whether a black and white image having the same content satisfies one or more policies of the online system 101.

The component search module 270 may use different processes for identifying stored components based on a type of a component. For example, to determine if the text of two advertisements are equivalent, keyword matching may be used. In one embodiment, the component search module 270 may require both texts to have the exact same words. In another embodiment, the component search module 270 identifies a stored component having at least a threshold number of words in common with a component.

To determine if a component of an advertisement object 160 specifying a landing page matches a landing page of another advertisement, the component search module 270 may compare the uniform resource locators (URLs) of the landing pages. If the URLs specify the same web page, web site, or other network destination, the component specifying the landing page is determined to match the landing page of the other advertisement. In some embodiments, the component search module 270 determines whether the domain names of the different landing pages match, and identifies landing pages as matching if the domain names match. For example, the landing pages "domain1.com/index.html" and "domain1.com/default.asp" are determined to match because both have the domain name "domain1.com." In other embodiments, the component search module 270 may access different landing pages to determine if the content of the landing pages is similar or matching.

A component of an advertisement may be an image presented when an advertisement is displayed. To determine whether an image component matches a stored image component, a signature or hash may be generated and compared to a database of image signatures or hashes. In one embodiment, similar images are assigned similar hashes. Hence, if the difference between the hashes of two images is below a threshold, the component search module 270 determines that the two images are match. In other embodiments one or more image processing methods are used to determine if two images are match.

In one embodiment, the component search module 270 searches components previously analyzed using complex processes. As an example, determining that an image references alcoholic beverages is difficult and may consume significant computational resources if reviewed multiple times. However, a title is usually short and conveys a clear message, so limited computational resources are used to analyze a title. Hence, storing results of image analysis provides a savings in the time for analyzing an advertisement while storing results of analysis of a title provides limited, if any, reduction in advertisement analysis time. Hence, analyzing components of advertisements and storing the results of the analysis expedites approval of advertisements and results in a more consistent advertisement review process.

Advertisement Component Analysis

The component review module 280 identifies components of an advertisement. In some embodiments, the component review module 280 assigns tags from a pre-determined list of tags or "ground truths" stored in the component rule store 285. Tags describe content features or attributes of the advertisement components. Hence, the tags describe characteristics of components of an advertisement. For example, an image including a picture of a beer mug may be tagged as "Alcohol Reference."

In some embodiments, tags are policy independent. As tags describe a component and do not specify whether a component satisfies a policy of the online system 101, if a policy changes, the tags associated with an advertisement object 160 may remain unchanged. For example, if a policy in the online system 101 specifying rejection of advertisements related to paintball is removed, components identified as related to paintball remain tagged as "Paintball Reference." When the advertisement approval module 130 reviews an advertisement object 160, the advertisement object 160 is not rejected for having the "Paintball Reference" tag, despite being rejected for having the "Paintball Reference" tag before the policy was removed.

In some embodiments, if analysis of a component is complex or if the component review module 280 determines the component needs further review, the component review module 280 may suggest manual review of the component. In one embodiment, the component review module 280 assigns a special tag, such as a "Needs More Review" tag to a component to be further reviewed. In some embodiments, tags associated with a component by a human reviewer are differentiated from tags assigned to the component by the component review module 280. For example if an image contains an alcohol reference, the component review module 280 assigns the component a "GT_ALCOHOL_REFER- ENCE" tag and the human reviewer assigns the component a "REP_ALCOHOL_REFERENCE" tag.

In some embodiments, if the component review module 280 identifies a component for manual review, the component is sent to multiple human reviewers (e.g., five reviewers) instead of a single human reviewer. In one embodiment, a tag is associated with a component if at least a threshold number or percentage of the reviewers assign the tag to the component. For example, if four out of five reviewers tag an image as "Suitable for All" and a single reviewer tags the image as "Revealing Body Parts," the image is assigned a tag of "Suitable for All." In another embodiment, the threshold number or percentage of reviewers to assign a tag to a component may vary depending on the type of tag. Each tag may have a different threshold number or percentage depending on a risk factor associated with the tag. For example, if five reviewers analyze a component, the component review module 280 may assign a tag to a component having a medium risk factor if two of the five reviewers assign the tag to the component and may assign a tag to a component having a high risk factor if a single reviewer assigns the tag to the component.

In some embodiments, if a human reviewer cannot determine which tag is the most appropriate for a component, the component review module 280 assigns a tag requesting generation of a new tag. For example, a "REP_NEED_BAD_TAG" tag may be associated with a component for which a tag cannot be identified. In one embodiment, the component review module 280 periodically reviews stored components associated with a "REP_NEED_BAD_TAG" tag to determine whether to create new tags.

Advertisment Analysis

After the component review module 280 reviews components of an advertisement, the advertisement review module 290 determines whether the advertisement satisfies one or more policies of the online system 101 based on the characteristics of the components. In some embodiments the advertisement review module 290 rejects an advertisement if any of its components is associated with a tag included on a blacklist. In other embodiments, an advertisement is rejected if at least a threshold number of components are associated with tags included on a blacklist.

In another embodiment, the advertisement review module 290 performs a more complex analysis based on multiple characteristics of components of an advertisement. For example, the advertisement review module 290 rejects an advertisement including an image tagged as "Alcohol Reference" and includes a target audience of "All." However, if another advertisement includes an "Alcohol Reference" tagged image and the target audience is identified as "Over 21," the advertisement is determined to satisfy a policy of the online system 101. In another embodiment, the advertisement review module 290 approves advertisement including an auto-approve tag associated with a component, regardless of tags associated with other components of the advertisement.

In some embodiments, if an advertisement is rejected, the advertisement approval module 130 sends a message notifying the user or advertiser creating the advertisement that the advertisement does not satisfy a policy of the online system 101. For example, a disapproval email describing the reasons for rejection of the advertisement and the policies the advertisement did not satisfy is sent to an advertiser. The disapproval email may also include a list of tags assigned to each component and suggestions for improving the advertisement.

Figure 3:
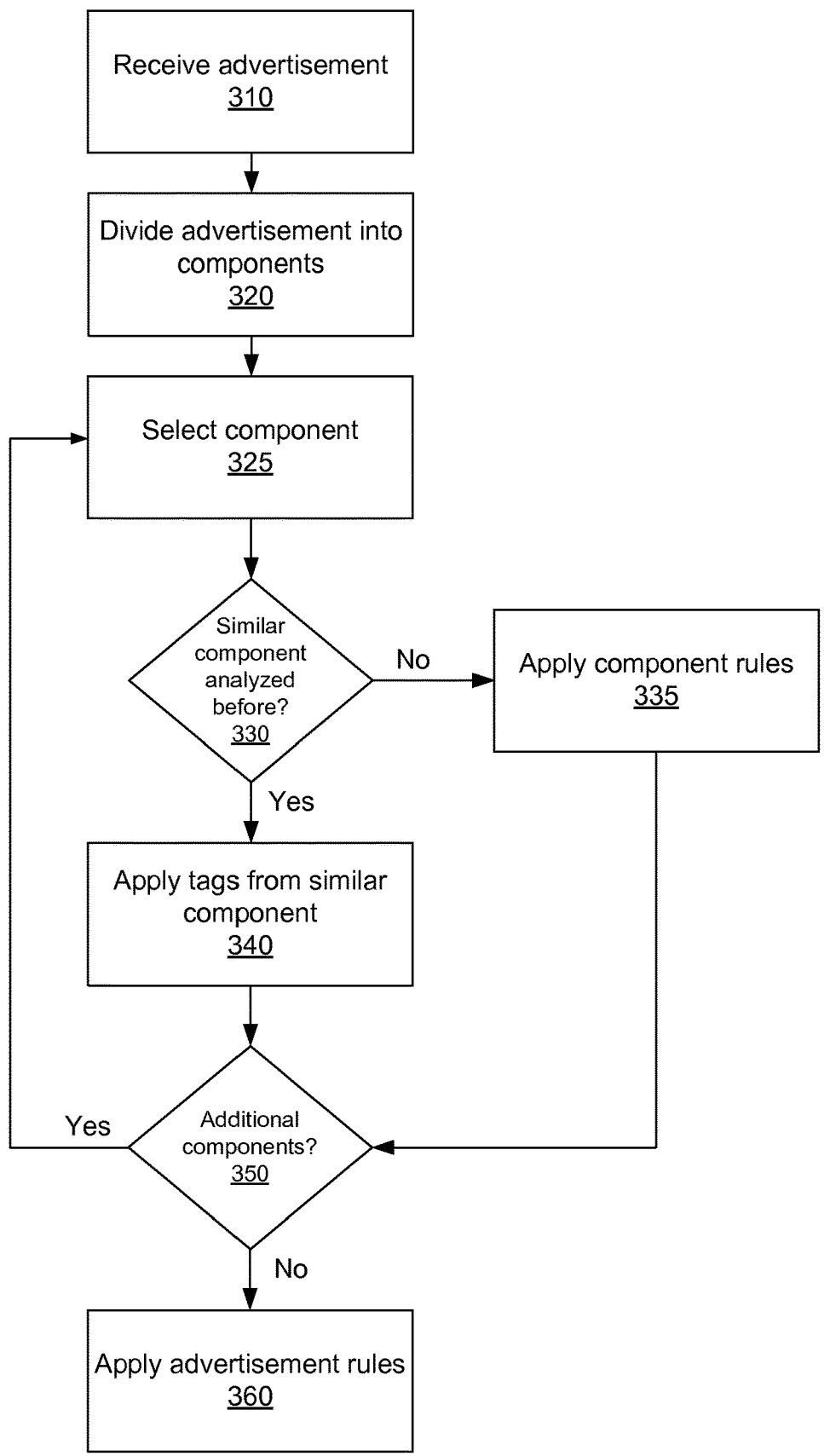
FIG. 3 is a flowchart of a process for approving advertisements in an online system, in accordance with one embodiment of the invention.

FIG. 3 shows a flowchart of a method for reviewing advertisements in an online system 101. The advertisement approval module 130 receives 310 an advertisement for review. The advertisement may be received 310 via an interface for advertisement creation, such as a web page or an application programming interface (API). The advertisement divider module 260 divides 320 the advertisement into one or more components. For example, the advertisement divider module 260 divides 320 the advertisement into a title, a body, an image, a landing page, an account identifier, or other suitable information.

A component of the advertisement is selected 325, and the component search module 270 determines 330 if a similar component from another advertisement is stored in the ad component store 250. If the component search module 270 determines 330 that a similar component is not stored in the ad component store 250, the component review module 280 applies 335 one or more component rules to associate one or more tags with the selected component. If the component search module 270 determines 330 the ad component store 250 includes a similar component, tags associated with the component included in the ad component store 250 are applied 340 to the selected component. The component search module 270 determines 350 if the advertisement includes additional components. If the advertisement includes additional components, another component is selected 325 and the preceding steps are repeated for the other component. If no additional components are included in the advertisement, the advertisement review module 290 applies 360 one or more advertisement rules to the components of the advertisement to determine if the advertisement satisfies one or more policies of the online system 101. For example, if at least a threshold number of components of the advertisement satisfy a policy of the online system 101, the advertisement is determined to satisfy the policy of the online system 101 and the advertisement may be presented by the online system 101. As another example, if a single component of the advertisement does not satisfy the policy of the online system 101, the advertisement is determines to not satisfy the policy and is not presented.

SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
   storing hash values of a plurality of components of previously reviewed content items;
   storing one or more reviews of the plurality of components of previously reviewed content items;
   receiving, at an online system, a content item from a user of the online system;
   dividing the received content item into a plurality of components, wherein a component is selected from a group consisting of: a title, a body, an image, a landing page, an audience description, an account identifying the user, and any combination thereof;
   for each of the plurality of components of the received content item:
      generating, by a computer, a hash value of the component of the received content item;
      determining whether the generated hash value of the component of the received content item matches a stored hash value of one or more components of previously reviewed content items;
      responsive to determining that a hash value of a component of a previously reviewed content item matches the hash value of the component of the received content item, associating the review associated with the matching component of the previously reviewed content item with the component of the received content item; and
      responsive to determining that a hash value of none of the components of previously reviewed content items matches the hash value of the component of the received advertisement content item:
         reviewing, by the computer, the component by applying one or more component policies of the online system to the component of the received content item to determine whether the component of the received content item violates the one or more component of the online system, and
         storing the generated hash value of the component in association with the review of the component; and
   determining, by the computer, whether the received content item satisfies one or more content item policies of the online system by applying the one or more content item policies on reviews associated with each of the components of the received content item.

2. The computer implemented method of claim 1, wherein the component is an image and the determining whether the component of the received content item matches one or more components of previously reviewed content items comprises:
   calculating a hash representative of the image; and
   determining whether the hash matches a hash from a previously reviewed image.

3. The computer implemented method of claim 2, wherein the determining whether the hash matches a hash from a previously reviewed image comprises;
   determining whether a distance between the hash and the hash from the previously reviewed image is within a threshold value.

4. The computer implemented method of claim 1, wherein the component is a landing page and determining whether the component of the received content item matches on or more components of previously reviewed content items comprises:
   determining whether a domain of the landing page matches a domain of a previously reviewed landing page.

5. The computer implemented method of claim 1, wherein reviewing the component comprises determining one or more tags describing characteristics of the component.

6. The computer implemented method of claim 5, further comprising:
   determining whether the received content item satisfies one or more content item policies of the online system based on the one or more tags associated with each of the plurality of components of the received content item.

7. The computer implemented method of claim 6, wherein determining whether the received content item satisfies one or more content item policies of the online system based on the one or more tags associated with each of the plurality of components of the received content item comprises:
   determining the received content item does not satisfy content item policy of the online system if at least one of the tags is included on a blacklist.

8. The computer implemented method of claim 6, wherein determining whether the received content item satisfies one or more content item policies of the online system based on the one or more tags associated with each of the plurality of components of the received content item comprises:
   determining the content item satisfies a content item policy of the online system if at least a threshold number of the plurality of components satisfy the component policy of the online system based on the one or more tags.

9. The computer implemented method of claim 6, wherein determining whether the received content item satisfies one or more content item policies of the online system based on the one or more tags associated with each of the plurality of components of the received content item comprises:
   determining the content item satisfies a content item policy of the online system if at least one of the tags indicates an automatic approval.

10. The computer implemented method of claim 6, further comprising:
   presenting the received content item to users of the online system in response to determining the received content item satisfies one or more content item policies of the online system.

11. The computer implemented method of claim 6, further comprising:
   providing a message to the user indicating whether the received content item satisfies one or more content item policies of the online system.

12. A computer implemented method comprising:
   storing hash values of a plurality of components of previously reviewed content items;
   storing information for the plurality of components of previously reviewed content items, the information indicating whether the components violate one or more component policies of an online system;
   receiving, at the online system, a content item from a user of the online system;
   dividing the received content item into a plurality of components, wherein the component is selected from a group consisting of: a title, a body, an image, a landing page, an audience description, an account identifying the user, and any combination thereof;
   for each component of the plurality of components:
      generating, by a computer, a hash value of the component of the received content item;
      determining whether the generated hash value of the component of the received advertisement content item matches a stored hash value of a component the previously reviewed content items,
      responsive to determining that the hash value of the component of the received content item matches a signature hash value of a component of the previously reviewed content items, determining whether the component of the received content item violates one or more component policies of the online system based on whether the stored information indicates that the matching component of the previously reviewed content items violates one or more component policies of the online system, and
      responsive to determining that the hash value of the component of the received content item does not match a hash value of a component of the previously reviewed content items, applying one or more of the component policies of the online system to the component of the received content item to determine whether the component of the received content item violates one or more component policies of the online system; and
   determining whether the received content item violates one or more content item policies of the online system based at least in part on whether the components of the received content item have been determined to violate one or more component policies of the online system.

13. The computer implemented method of claim 12, wherein determining whether the received content item violates one or more content item policies of the online system comprises:
   determining the received content item violates a content item policy of the online system if at least one component of the received content item has been determined to violate the component policy of the online system.

14. The computer implemented method of claim 12, wherein determining whether the received content item violates one or more content item policies of the online system comprises:
   determining the content item does not violate a content item policy of the online system if at least one component of the received content item has a characteristic indicating automatic approval for the component policy.

15. The computer implemented method of claim 12, wherein the component is selected from a group consisting of: a title, a body, an image, a landing page, an audience description, an account identifying the user, and any combination thereof.

16. The computer implemented method of claim 12, further comprising:
   presenting the received content item to users of the online system in response to determining the content item does not violate the one or more content item policies of the online system.

17. The computer implemented method of claim 12, further comprising:
   providing a message to the user indicating whether the received content item violates one or more content item policies of the online system.

* * * * *